Oct. 10, 1939.                I. G. FRY                2,175,938
                           REEL-END ALARM
                         Filed May 14, 1938
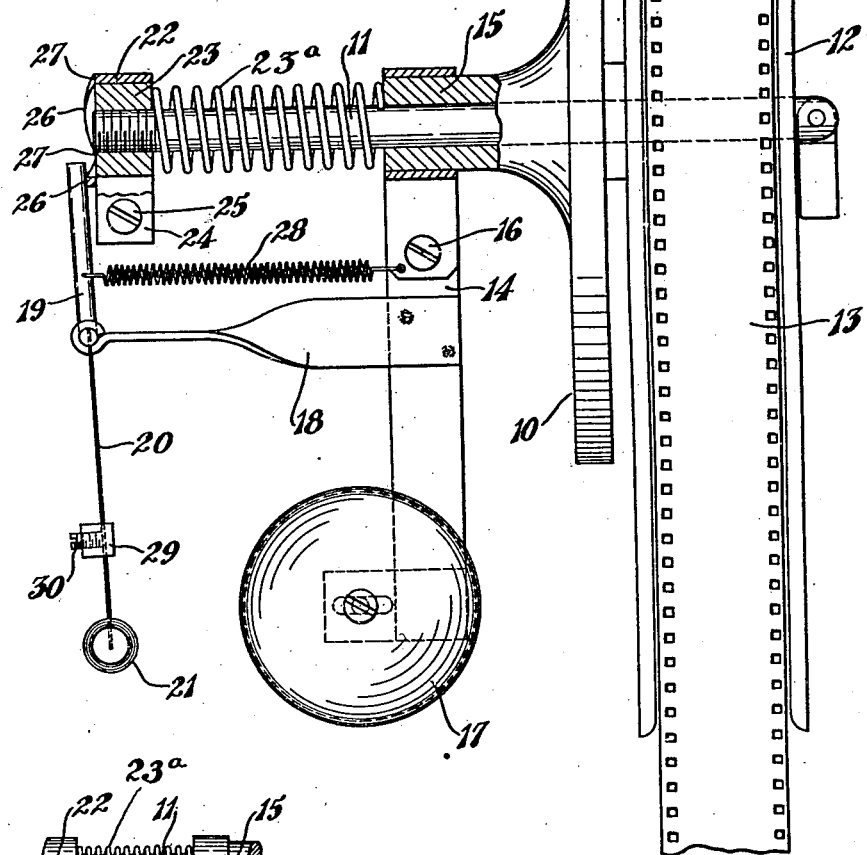
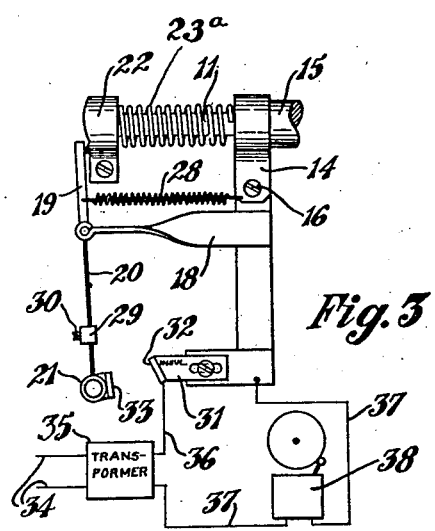
Inventor
Ivan G. Fry Patented Oct. 10, 1939

2,175,938

UNITED STATES PATENT OFFICE 2,175,938

REEL-END ALARM

Ivan G. Fry, Minerva, Ohio

Application May 14, 1938, Serial No. 207,970

1 Claim. (Cl. 116—67)

The usual motion picture is made up of several reels of film, and in order that the picture may be continuously shown without any break or delay between the several films, it is common practice to use two projectors alternately to show a complete picture. To accomplish this operation in a satisfactory manner it is necessary for the operator to start the second projector with the next reel of film at the instant the unwinding of the preceding reel of film is completed in the first projector.

It is an object of the present invention to provide a simple and efficient alarm which will give ample warning to the operator that the unwinding of the film is about to be completed, and which will not injure the film.

Another object is to provide an alarm device adapted to be operated only when the shaft of the reel carrying the film is rotated at a predetermined speed.

A further object is to provide an alarm device including a vibratile spring or reed adapted to be vibrated by the rotation of the reel shaft, and signal means adapted to be operated by said vibratile spring when the same is vibrated at a certain speed.

A still further object is to provide an alarm device of the character referred to in which the vibratile spring is arranged to vibrate by means of a cam upon the shaft of the reel.

The above objects together with others which will be apparent from the drawing, or which may be later pointed out, may be attained by constructing the improved alarm device in the manner illustrated in the accompanying drawing, in which:

Figure 1 is a sectional elevation of a film reel of a motion picture projector showing the improved alarm applied thereto;

Fig. 2, a detached, perspective view of the cam upon the reel shaft; and

Fig. 3, a diagrammatic view of a slightly modified form of the invention.

Similar numerals refer to similar parts throughout the drawing.

The upper magazine of a conventional motion picture projector is indicated generally at 10, the usual shaft 11 being journaled therein and carrying the reel 12 from which the film 13 is adapted to be withdrawn as the projector is operated.

The alarm device to which the invention pertains may include an audible or visible signal arranged to be operated either mechanically or electrically.

In Fig. 1 is illustrated in detail the manner in which an audible signal may be mechanically operated. The alarm device is shown as mounted upon a bracket 14, clamped upon the bearing portion 15 of the magazine, as by a screw 16, and having a gong 17 mounted upon its end portion.

A laterally extending arm 18 is fixed at one end upon an intermediate portion of the bracket as by spot welding or other suitable means, and a rod 19 is pivoted upon said arm and carries a vibratile element which may be in the form of a flexible spring 20, having a hammer 21 thereon for contact with the gong 17.

A cam 22 is fixed upon the reel shaft 11 in any suitable manner as by clamping the same upon a nut 23 fixed upon said shaft for adjusting the tension of the spring 23a. As shown in Fig. 2 this cam may be formed of sheet metal having the two ears 24 adapted to be clamped together as by screw 25 to attach the cam upon the collar 23. The outer edge of the cam 22 is provided with a series of alternate high and low points 26 and 27 respectively, there being three of each in the cam shown in the drawing.

For the purpose of holding the rod 19 in contact with the outer end of the cam 22 a spring 28 may be provided, being connected at one end to the bracket 14 and at its other end to the rod 19. A weight 29 is vertically adjustable upon the spring element 20 and arranged to be fixed in adjusted position thereon as by the set screw 30.

As the motion picture projector is operated in usual and ordinary manner the film 13 is withdrawn from the reel 12 rotating the reel and with it the shaft 11. It will of course be obvious that with the film traveling at constant speed through the projector the speed of rotation of the reel and the shaft 11 will increase as the film is unwound therefrom.

This rotation of the shaft 11 produces an oscillation of the rod 19 by means of the cam 22 and as the rod 19 oscillates the spring 20 will be vibrated. As the rotating speed of the shaft 11 increases the oscillation of the rod 19 will be increased in proportion and when the rotating speed of the shaft reaches the point where the oscillations or vibrations given to the rod 19 are equal to or in resonance with the natural vibrating period of the spring 20 and hammer 21 then the hammer will swing through a very large arc and strike the gong 17 giving warning to the operator that the film is coming to an end.

As the speed of the shaft 11 increases still further so that the rod 19 is vibrated above the natural vibrating period of the spring 20 and hammer 21, then the hammer will swing through a smaller arc so as to stop the ringing of the bell.

Thus the bell will ring only when the shaft 11 is traveling at a predetermined speed which causes the vibrations given to the rod 19 to be in resonance with the natural vibrating period of the spring 20 and hammer 21 and the bell will not ring at either a higher or lower speed of the shaft 11.

The speed at which the bell will be rung may be regulated by adjusting the weight 29 upon the spring 20 so that the warning may be given at any predetermined time before the film has been completely unwound from the reel.

In Fig. 3 is shown a modified form of the invention in which the warning signal is arranged to be operated electrically. In this case all of the parts with the exception of the gong 17 are the same as illustrated in Fig. 1 and the same reference numerals are applied thereto.

An insulation block 31 is mounted upon the lower portion of the bracket 14 in place of the gong 17 and has a contact point 32 mounted thereon. A contact point 33 is carried by the hammer 21 and an electric circuit is shown at 34 passing through a transformer 35 such as the ordinary door bell transformer, one wire 36 leading from the transformer to the contact point 32, the other wire 37 leading from the transformer through an ordinary electric bell 38 and then to the bracket 14. It will be seen that when the spring 20 and hammer 21 vibrate at the natural vibrating period the contact point 33 upon the hammer will intermittently make contact with the fixed contact point 32 closing the circuit from the electric bell 38 through the bracket 14, arm 18, spring 26 and contact point 33 to the contact point 32 so that the electric bell will be rung.

It will be obvious that instead of providing a bell any suitable audible or visible signal may be located in the circuit.

From the above it will be seen that a very simple, efficient and accurate alarm device is provided which may be quickly and easily installed upon the ordinary motion picture projector without requiring any change in the construction of the projector and which will work automatically without resetting to give an alarm when the film has been nearly withdrawn from the reel and which may be easily adjusted so that the alarm will be given at any desired time before the film is entirely withdrawn from the reel.

Although the invention has been illustrated and described as applied to a motion picture projector it is not intended that the invention shall be limited to this specific use as it is obvious that the alarm device may be applied to many different kinds of machines to give warning when a rotating part is traveling at a predetermined speed without in any way changing the construction or operation of the alarm device as illustrated and described herein.

I claim:

In combination with a rotating shaft, a cam upon said shaft, a rod pivoted at a point spaced from the cam, spring means for holding the free end of the rod in contact with the cam, a vibratile member connected to the other end of the pivoted rod, a hammer upon the free end of the vibratile member and a bell mounted adjacent to said hammer, the several parts being so arranged and the vibratile member being of such size and shape that when the shaft is rotated at a speed to vibrate said rod in resonance with the natural vibrating period of the vibratile member the hammer carried thereby will strike the bell while at all other speeds of the shaft the hammer will not strike the bell.

IVAN G. FRY.